US012664401B2

(12) United States Patent
Rossiello et al.

(10) Patent No.: US 12,664,401 B2
(45) Date of Patent: Jun. 23, 2026

(54) TRANSFORMER-BASED MODEL KNOWLEDGE GRAPH LINK PREDICTION

(71) Applicant: International Business Machines Corporation, Armonk, NY (US)

(72) Inventors: Gaetano Rossiello, Brooklyn, NY (US); Alfio Massimiliano Gliozzo, Brooklyn, NY (US); Xuan Wang, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 17/228,099

(22) Filed: Apr. 12, 2021

(65) Prior Publication Data

US 2022/0327356 A1      Oct. 13, 2022

(51) Int. Cl.
| | |
|---|---|
| *G06N 3/042* | (2023.01) |
| *G06F 16/28* | (2019.01) |
| *G06F 16/901* | (2019.01) |
| *G06N 3/045* | (2023.01) |
| *G06N 3/08* | (2023.01) |

(52) U.S. Cl.
CPC ........... *G06N 3/042* (2023.01); *G06F 16/284* (2019.01); *G06F 16/9024* (2019.01); *G06N 3/045* (2023.01); *G06N 3/08* (2013.01)

(58) Field of Classification Search
CPC ... G06F 16/284; G06F 16/9024; G06N 3/042; G06N 3/045; G06N 3/08; G06N 3/088; G06N 5/025; G06N 3/0895
See application file for complete search history.

(56) References Cited

U.S. PATENT DOCUMENTS

| | | |
|---|---|---|
| 10,963,941 B2 | 3/2021 | Garcia Duran et al. |
| 2018/0060733 A1 | 3/2018 | Beller et al. |

(Continued)

FOREIGN PATENT DOCUMENTS

| | | |
|---|---|---|
| CN | 109885691 | 6/2019 |
| CN | 109977234 | 7/2019 |

(Continued)

OTHER PUBLICATIONS

Wang et al., "Structure-Augmented Text Representation Learning for Efficient Knowledge Graph Completion", Feb. 24, 2021, arXiv:2004.14781v2, pp. 1-12. (Year: 2021).*

(Continued)

*Primary Examiner* — Brent Johnston Hoover
(74) *Attorney, Agent, or Firm* — Seed Intellectual Property Law Group LLP

(57) ABSTRACT

A system, product, and method are provided for improving knowledge graph (KG) link prediction using transformer-based artificial neural networks. A first topic model is leveraged against a first dataset derived from a KG containing a plurality of first triples. The first triples include first entities and first edges connecting the first entities to represent relationships between the first connected entities. A first similarity function is applied to the first connected entities of the first triples to provide respective first similarity scores. A first subset of one or more first triples is selected from the plurality of first triples based upon the first similarity scores. An artificial neural network is trained using the selected first subset of one or more first triples.

20 Claims, 8 Drawing Sheets

(56)     References Cited

U.S. PATENT DOCUMENTS

| 2018/0144252 | A1 | 5/2018 | Minervini et al. |
| 2020/0065416 | A1 | 2/2020 | Gliozzo et al. |
| 2020/0073933 | A1 | 3/2020 | Zhao et al. |
| 2020/0074301 | A1 | 3/2020 | Shang et al. |
| 2022/0366274 | A1* | 11/2022 | Lawrence .............. G06N 20/00 |

FOREIGN PATENT DOCUMENTS

| CN | 110334220 | | 10/2019 |
| CN | 110851612 | | 2/2020 |
| CN | 110851615 | | 2/2020 |
| CN | 111026875 | | 4/2020 |
| CN | 111552817 | | 8/2020 |
| CN | 111881219 | | 11/2020 |
| CN | 117136366 | A | 11/2023 |
| JP | 2019-016269 | A | 2/2019 |
| JP | 2019-049980 | A | 3/2019 |
| JP | 2020-191009 | A | 11/2020 |
| JP | 2024-513293 | A | 3/2024 |
| WO | 2019/138289 | A1 | 7/2019 |
| WO | 2019220128 | | 11/2019 |
| WO | 2020/037217 | A1 | 2/2020 |
| WO | 2022/219435 | A1 | 10/2022 |

OTHER PUBLICATIONS

Gupta, S., et al., "CaRe: Open Knowledge Graph Embeddings", Proceedings of the 2019 Conference on Empirical Methods in Natural Language Processing and the 9th International Joint Conference on Natural Language Processing (EMNLP-IJCNLP), pp. 378-388, Nov. 3-7, 2019.

Broscheit, S., et al. "Can We Predict New Facts with Open Knowledge Graph Embeddings? A Benchmark for Open Link Prediction", Proceedings of the 58th Annual Meeting of the Association for Computational Linguistics, pp. 2296-2308, Jul. 5-10, 2020.

Yao, L., et al. "KG-BERT: BERT for Knowledge Graph Completion." arXiv preprint arXiv:1909.03193, Sep. 11, 2019.

Yao, Liang, et al., "KG_BERT: BERT for Knowledge Graph Completion", arXiv:1909.03193v2, Sep. 11, 2019.

Galkin, Mikhail, et al., "Message Passing for Hyper-Relational Knowledge Graphs", Proceedings of the 2020 Conference on Empirical Methods in Natural Language Processing, pp. 7346-7359, Nov. 16-20, 2020.

Liu, Weijie, et al., "K-BERT: Enabling Language Representation with Knowledge Graph", arXiv:1909.07606v1, Sep. 17, 2019.

International Search Report and Written Opinion, PCT Application No. PCT/IB2022/052547, Jun. 28, 2022.

Japan Patent Office, "Notice of Reasons for Refusal" Sep. 2, 2025, 05 Pages, JP Application No. 2023-549061.

The State Intellectual Property Office of People's Republic of China, "First Office Action", Nov. 26, 2025, 8 Pages, CN Application No. 202280027738.X.

* cited by examiner

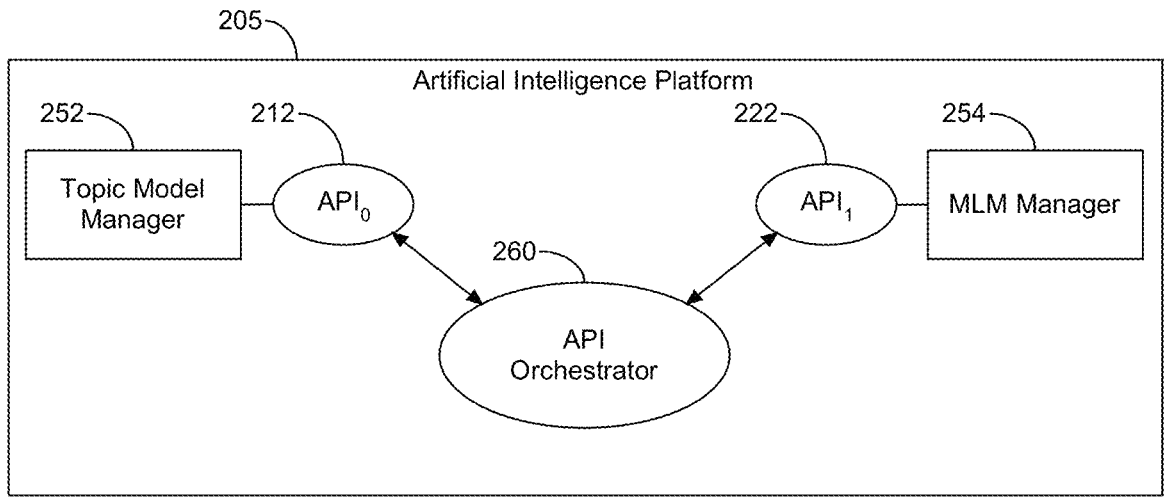
205
Artificial Intelligence Platform
252
Topic Model
Manager
212
API$_0$
260
API
Orchestrator
222
API$_1$
254
MLM Manager
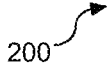
200
FIG. 2

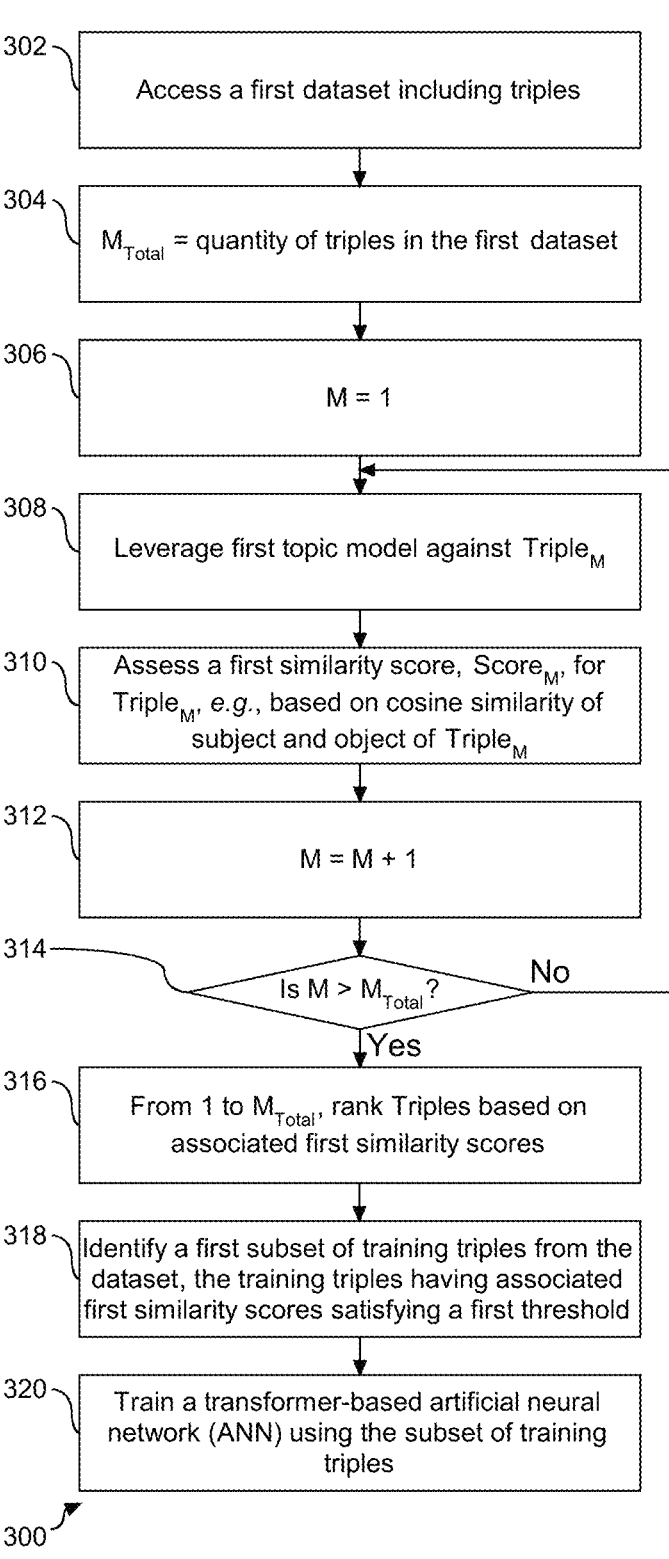

302 — Access a first dataset including triples

304 — $M_{Total}$ = quantity of triples in the first dataset

306 — M = 1

308 — Leverage first topic model against $Triple_M$

310 — Assess a first similarity score, $Score_M$, for $Triple_M$, e.g., based on cosine similarity of subject and object of $Triple_M$

312 — M = M + 1

314 — Is $M > M_{Total}$?    No

Yes

316 — From 1 to $M_{Total}$, rank Triples based on associated first similarity scores 318 — Identify a first subset of training triples from the dataset, the training triples having associated first similarity scores satisfying a first threshold 320 — Train a transformer-based artificial neural network (ANN) using the subset of training triples

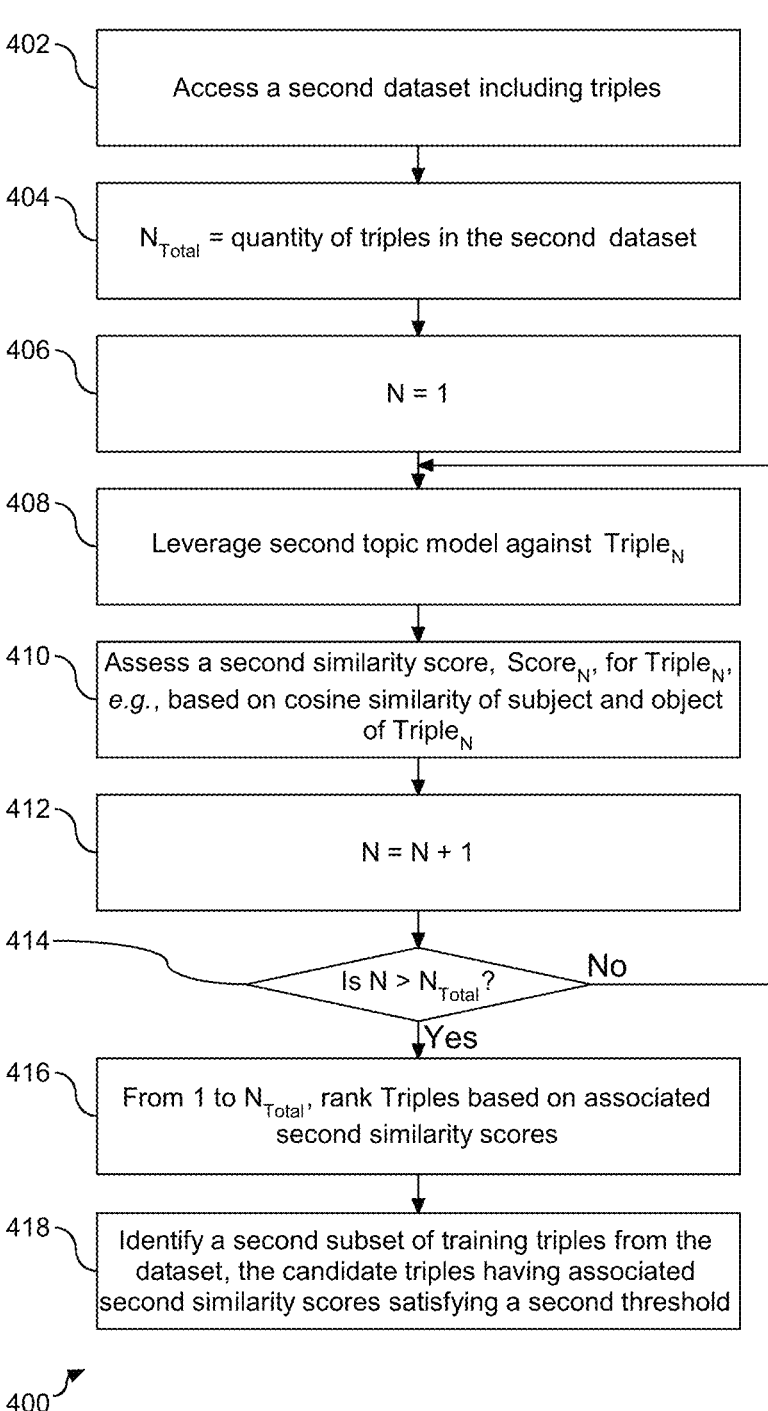

402 — Access a second dataset including triples

404 — $N_{Total}$ = quantity of triples in the second dataset

406 — N = 1

408 — Leverage second topic model against $Triple_N$

410 — Assess a second similarity score, $Score_N$, for $Triple_N$, *e.g.*, based on cosine similarity of subject and object of $Triple_N$

412 — N = N + 1

414 — Is N > $N_{Total}$?　　No

Yes

416 — From 1 to $N_{Total}$, rank Triples based on associated second similarity scores 418 — Identify a second subset of training triples from the dataset, the candidate triples having associated second similarity scores satisfying a second threshold

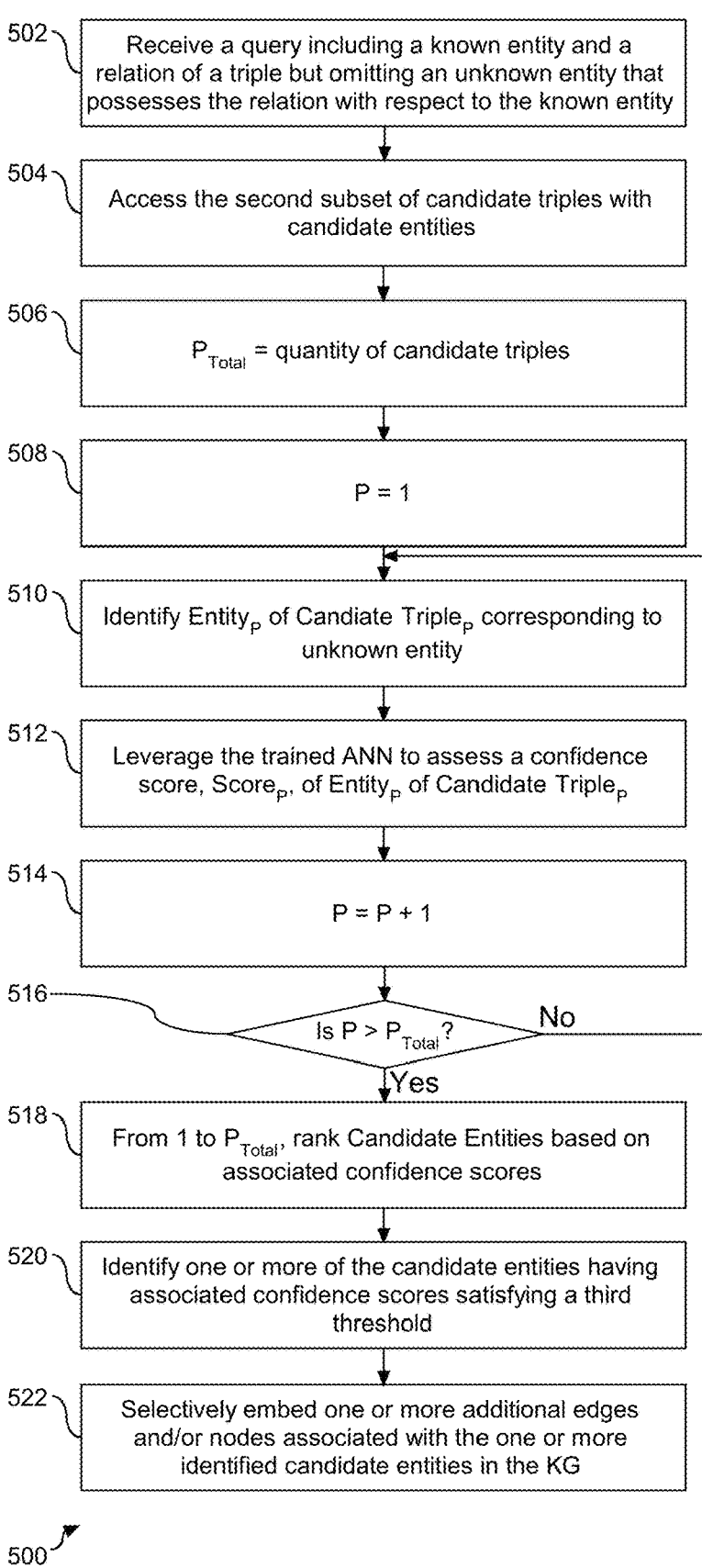

502 — Receive a query including a known entity and a relation of a triple but omitting an unknown entity that possesses the relation with respect to the known entity 504 — Access the second subset of candidate triples with candidate entities 506 — $P_{Total}$ = quantity of candidate triples

508 — P = 1

510 — Identify $Entity_p$ of Candiate $Triple_p$ corresponding to unknown entity 512 — Leverage the trained ANN to assess a confidence score, $Score_p$, of $Entity_p$ of Candidate $Triple_p$

514 — P = P + 1

516 — Is $P > P_{Total}$?          No          Yes

518 — From 1 to $P_{Total}$, rank Candidate Entities based on associated confidence scores 520 — Identify one or more of the candidate entities having associated confidence scores satisfying a third threshold 522 — Selectively embed one or more additional edges and/or nodes associated with the one or more identified candidate entities in the KG

TRANSFORMER-BASED MODEL KNOWLEDGE GRAPH LINK PREDICTION

BACKGROUND

The present embodiments relate to improving performance of a language model based on an artificial neural network, particularly a transformer-based model, for predictions in connection with supplementing or completing knowledge graphs.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a dataset to solve problems and provide relevant recommendations. For example, in the field of artificial intelligent (AI) computer systems, natural language systems (such as the IBM Watson® artificially intelligent computer system or other natural language interrogatory answering systems) process natural language based on system-acquired knowledge. To process natural language, the system may be trained with data derived from a database or corpus of knowledge, but the resulting outcome can be incorrect or inaccurate for a variety of reasons.

Machine learning (ML), which is a subset of AI, utilizes algorithms to learn from data and create foresights based on this data. AI refers to the intelligence when machines, based on information, are able to make decisions, which maximizes the chance of success in a given topic. More specifically, AI is able to learn from a dataset to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based upon an express or inherent relationship within the structure. Adequate datasets are relied upon for building those structures. An example of such a dataset is a knowledge graph (KG) that uses a graph-structured data model or topology to integrate data.

Many AI systems rely on knowledge graphs (KGs) as a critical resource for performing such tasks as question answering (QA), semantic searching, and making recommendations. A KG represents a collection or dataset of interlinked data that typically is composed of triples (also referred to as triplets) of information. A KG includes descriptions of entities, which are represented by vertices or nodes, linked or connected to each other by relations or predicates, which are represented by edges linking or connecting the vertices or nodes in the KG. The interlinked entities of a triple are sometimes referred to as a subject and an object having a relationship represented by the relation of the triple. The entities can include, for example, real-world objects, events, situations or abstract concepts. KGs may be constructed by identifying the associations between different entities. KGs have progressed to the point that some are known to include millions, and even billions, of entries.

Some KGs are used in conjunction with ontologies. An ontology encompasses a representation, formal naming and definition of the categories, properties and relations between the concepts, data and entities that substantiate one, many or all domains of discourse. Every field creates ontologies to limit complexity and organize information into data and knowledge. As new ontologies are made, their use hopefully improves problem solving within that domain.

KGs often contain large volumes of factual information with less formal semantics. For example, a KG in the genomics domain may include entities such as genes, gene variants, medications, and diseases, and may indicate relations between the entities, such as the associations of certain gene variants with particular diseases. Conventional approaches to the construction of KGs require researchers, who are subject matter experts, to study new publications in order to discover relationships between entities. While KGs can provide researchers with insights into the interrelations of entities, the manual assembly and updating of KGs can be quite complex and time-consuming. Another problem that arises in connection with KGs is that the data contained with the KGs are often incomplete.

Open KGs, on the other hand, do not require pre-specified ontology, making open KGs highly adaptable. In open KGs, the same latent entity may be represented by different nodes labeled with different noun phrases (NPs). For example, the entity 'U.S. President' may be represented by a first node "U.S. President" and a second node "President." Similarly, in open KGs, the same latent relation can be represented by different relation phrases (RPs). For example, the RPs "took birth in" and "was born in" refer to the same underlying relation.

Subject matter experts (SMEs) can be at least partially removed from the process of preparing KGs by using a link prediction model. The goal of the link prediction model is to predict missing entities (nodes) or relations (edges) in the KG. Prediction models assess the plausibility of triples not present in the KG to supplement or complete the KGs. For example, link prediction may involve answering a query identifying a subject and a relation to predict the missing object. As a specific example, link prediction may provide the link prediction model with a query "First Lady" as the subject and "spouse of" as the relation to identify "U.S. President" as the object. In another embodiment, the KG may include a link between "First Lady" and "U.S. President", but may lack a similar link between "First Lady" and "U.S." The prediction model in this example would identify an edge representing a relation between the entities First Lady and U.S. President (or "President") where the relation is missing from an incomplete KG.

Liang Yao, et al., KG-BERT: BERT for Knowledge Graph Completion, which is incorporated herein by reference, proposes the use of a pre-trained language model known as Knowledge Graph Bidirectional Encoder Representations from Transfer (KG-BERT) to model triples. Yao describes BERT as pre-trained contextual language representation model built on a multilayer bidirectional transformer encoder. According to Yao, entity and relation descriptions of a triple are received as textual sequence input to a KG-BERT model, and the KG-BERT computes a scoring function of the triple. The method is said to achieve "state-of-the-art results in triple classification, relation prediction and link prediction tasks." Triple classification aims to judge whether a given subject-relation-object (s, r, o) triple is correct. Link prediction predicts a missing element (subject or object) given the other element (object or subject) and the relation, i.e., (s, r, ?) or (?, r, o). Relation prediction aims to predict relation from a subject and object, i.e., (s, ?, o).

However, the inventors have discovered a major technological problem associated with scalability in connection with the training and use of prediction models for large datasets. Training, testing (or validation), and use runtimes of prediction models can be protracted, particularly where the associated KG is complex, such as a KG containing millions or billions of entries. Training and testing runtimes for particularly voluminous KGs or datasets theoretically can take days, months, or even years, thus presenting a significant technological problem.

SUMMARY

Embodiments include a system, a computer program product, and a method for natural language processing (NLP), including NLP directed at improving performance of a language model, particularly a transformer-based model, in knowledge graph link prediction and/or relation prediction.

In one aspect, a system is provided with a processing unit operatively coupled to memory, with an artificial intelligence (AI) platform in communication with the processing unit and memory. The AI platform is configured with one or more tools to support modification of a knowledge graph, with the tools including a topic model manager and a machine learning manager (MLM). The topic manager is configured to leverage a first topic model against a first dataset derived from a knowledge graph (KG) containing a plurality of first triples. The first triples include first entities and first edges connecting the first entities to represent relationships between the first connected entities. The topic model is further configured to apply a first similarity function to the first connected entities of the first triples to provide respective first similarity scores, and select a first subset of one of more first triples from the plurality of first triples based upon the first similarity scores. The MLM is configured to train an artificial neural network using the selected first subset of one or more first triples.

In another aspect a computer program product is provided. The computer program product includes a computer readable storage device having embodied program code that is executable by a processor. The program code is executable by the processor to leverage a first topic model against a first dataset derived from a knowledge graph (KG) containing a plurality of first triples, which include first entities and first edges connecting the first entities to represent relationships between the first connected entities. The program code is further executable by the processor to apply a first similarity function to the first connected entities of the first triples to provide respective first similarity scores, select a first subset of one of more first triples from the plurality of first triples based upon the first similarity scores, and train an artificial neural network (ANN) using the selected first subset of one or more first triples.

In yet another aspect, a method is provided in which a first topic model is leveraged against a first dataset derived from a knowledge graph (KG) containing a plurality of first triples. The first triples include first entities and first edges connecting the first entities to represent relationships between the first connected entities. A first similarity function is applied to the first connected entities of the first triples to provide respective first similarity scores. A first subset of one of more first triples is selected from the plurality of first triples based upon the first similarity scores. An artificial neural network is trained using the selected first subset of one or more first triples.

These and other features and advantages will become apparent from the following detailed description of the exemplary embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

FIG. 2 depicts a block diagram illustrating the tools shown in FIG. 1 and their associated APIs according to an embodiment.

FIG. 3 depicts a flow chart illustrating an embodiment of a method involving the use of a first topic model for selecting a training set to train an artificial neural network (ANN).

FIG. 4 depicts a flow chart illustrating an embodiment of a method involving the use of a second topic model for selecting a candidate set for use or testing of a trained ANN.

FIG. 5 depicts a flow chart illustrating an embodiment of a method involving the use of a trained ANN, e.g., in connection with testing, validation, or making predictions.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment. It should be understood that the various embodiments may be combined with one another and that any one embodiment may be used to modify another embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As shown and described herein, a technical solution to this technical problem is provided by developing the system, computer program product, method, and other aspects described and/or illustrated herein.

Figure 1:
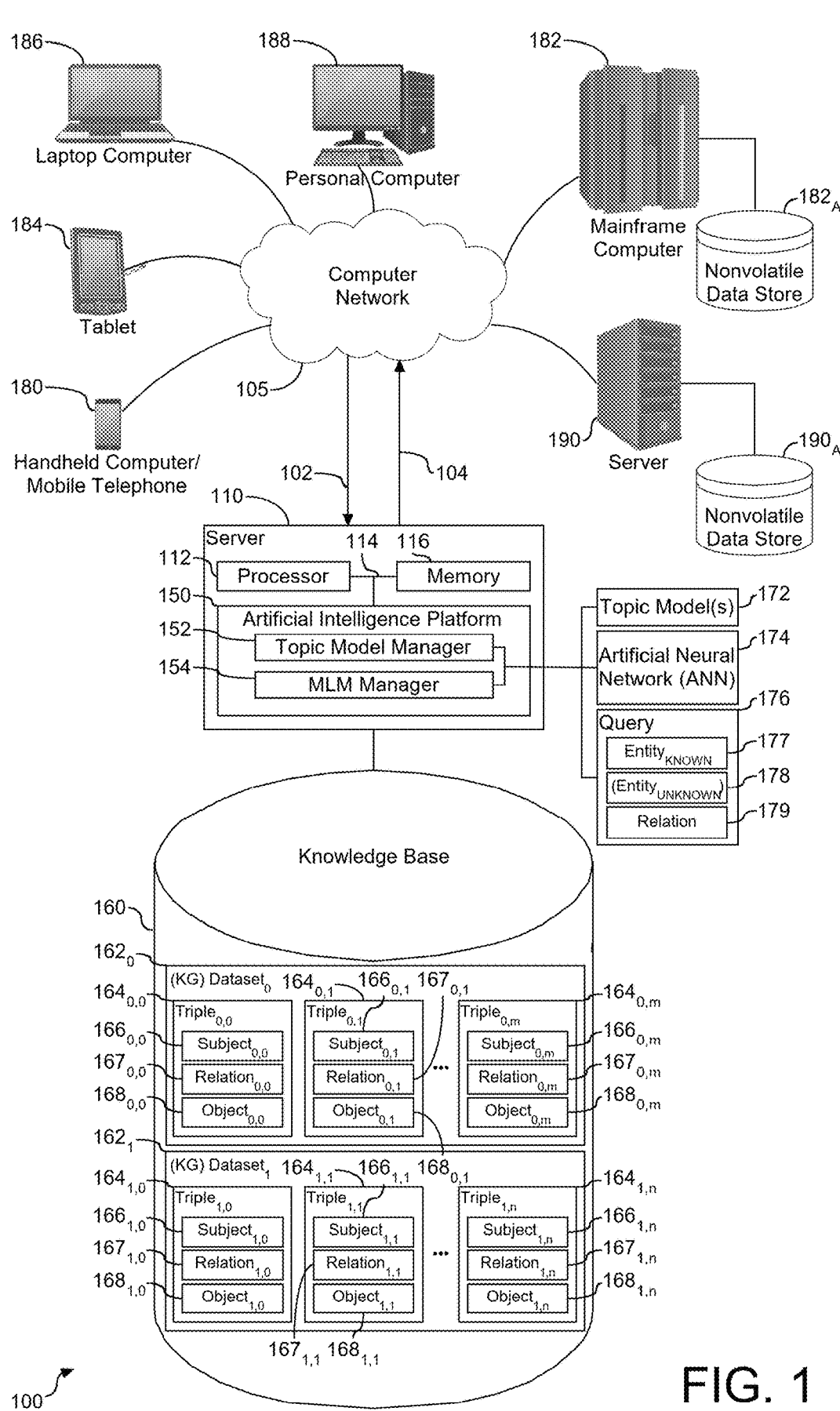
FIG. 1 depicts a system diagram illustrating a schematic diagram of a system including a transformer-based model according to an embodiment.

Referring to FIG. 1, a schematic diagram of a system (100) is depicted. As shown, a server (110) is provided in communication with a plurality of computing devices (180), (182), (184), (186), (188), and (190) across a computer network (also referred to herein as a network connection) (105). The server (110) is configured to receive input content (102) from the computer network (105) and to transmit output content (104) to the computer network (105). The server (110) is provided with a processor (112), also referred to herein as a processing unit, and operatively coupled to memory (116) across a bus (114). A tool in the form of an artificial intelligence (AI) platform (also referred to herein as a knowledge engine) (150) is shown local to the server (110), and operatively coupled to the processing unit (112) and the memory (116). As shown, the AI platform (150) contains one or more tools (152) and (154). The tools (152) and (154) provide management for allowing the training of and inference processing of an artificial neural network (ANN) model, including a transformer-based ANN model such as KG-BERT, over the computer network (105) from one or more of the computing devices (180), (182), (184), (186), (188), and (190).

The computing devices (180), (182), (184), (186), (188), and (190) communicate with each other and with other devices or components via one or more wires and/or wireless data communication links, where each communication link may comprise one or more of wires, routers, switches, transmitters, receivers, or the like. In this networked arrangement, the server (110) and the network connection (105) may enable the exchange of input content (102) and output content (104), e.g., model training and inference operations for one or more content users. Other embodiments of the server (110) may be used with components, systems, sub-systems, and/or devices other than those that are depicted herein.

As shown and described herein, the tools of the AI platform (150) include a topic model manager (152) and a machine learning model (MLM) manager (154). The AI platform (150) may be configured to receive input and/or transmit from and to various sources, including but not limited to input from the network (105) via the input content (102) and output content (104), one or more knowledge graph (KG) datasets from a knowledge base or corpus structure (160), a topic model (172), and an artificial neural network (ANN) (174).

As shown, the knowledge base (160) includes a library of datasets, which in an embodiment includes a first dataset, $Dataset_0$ ($162_0$), and a second dataset, $Dataset_1$ ($162_1$). In an exemplary embodiment, the datasets $Dataset_0$ ($162_0$) and $Dataset_1$ ($162_1$) represent different data derived from the same knowledge graph (KG). For example, data from the KG may be split into $Dataset_0$ ($162_0$), a subset of which will be used for training, and into $Dataset_1$ ($162_1$), a subset of which will be used for testing or inference. In an exemplary embodiment, $Dataset_0$ ($162_0$) and $Dataset_1$ ($162_1$) are embodied as a KG. Alternatively, either or both of $Dataset_0$ ($162_0$) and $Dataset_1$ ($162_1$) may be embodied as structured data in another format, particularly one derived from a KG, such as, e.g., an embedding lookup table generated by the topic model (172). The quantity of datasets shown herein should not be considered limiting.

As understood in the art, the KG is a structure (e.g., ontology) and does not merely store data. Specifically, an information extraction (IE) model, examples of which are known in the art, extracts data and one or more data relationships from unstructured data, creates an entry for the extracted data and data relationship(s) in the KG, and stores the data and data relationship(s) in the created KG entry. The IE model may be leveraged to automatically extract triples from unstructured text. Alternatively, datasets may be compiled manually, such as by a subject matter expert (SME).

In an embodiment, data elements in a KG are stored or represented in nodes and a relationship between two data elements is represented as an edge connecting or linking two nodes. Similarly, in an embodiment, each node has a node level confidence or veracity value and each relationship has a relationship confidence or veracity value, with the relationship veracity value calculated based on the veracity values of the two inter-connected nodes.

In FIG. 1, the first dataset, $Dataset_0$ ($162_0$), represents data derived from a knowledge graph (KG) including a first plurality of triples. Specifically, the $Dataset_0$ ($162_0$) includes $Triple_{0,0}$ ($164_{0,0}$), $Triple_{0,1}$ ($164_{0,m}$), and $Triple_{0,m}$ ($164_{0,m}$), wherein m is an integer equal to or greater than two. Although three triples are shown in the first dataset, $Dataset_0$ ($162_0$), it should be understood that the $Dataset_0$ ($162_0$) may include additional triples, including tens, hundreds, thousands, millions, or billions of triples, e.g., "m" may be equal to, for example, 10 to 1 billion. Each $Triple_{0,0}$ ($164_{0,0}$), $Triple_{0,1}$ ($164_{0,1}$), . . . and $Triple_{0,m}$ ($164_{0,m}$) includes a subject, relation, and object. By way of example, and as shown herein, $Triple_{0,0}$ ($164_{0,0}$) includes $Subject_{0,0}$ ($166_{0,0}$), $Relation_{0,0}$ ($167_{0,0}$), and $Object_{0,0}$ ($168_{0,0}$). $Triple_{0,1}$ ($164_{0,1}$) includes $Subject_{0,1}$ ($166_{0,1}$), $Relation_{0,1}$ ($167_{0,1}$), and $Object_{0,1}$ ($168_{0,1}$). $Triple_{0,1}$ ($164_{0,m}$) includes $Subject_{0,m}$ ($166_{0,m}$), $Relation_{0,m}$ ($167_{0,m}$), and $Object_{0,1}$ ($168_{0,m}$).

The topic model manager (152) is configured to leverage the topic model (172) against the first dataset, $Dataset_0$ ($162_0$). Generally, topic modeling is a machine learning technique that automatically analyzes text data to determine cluster words for a set of documents. This is known as 'unsupervised' machine learning because the technique does not require a predefined list of tags or training data that has been previously classified by humans. In machine learning and natural language processing, a topic model is a type of statistical model for discovering the abstract "topics" that occur in a collection of documents. Examples of topic models include, but are not limited to Latent Semantic Analysis (LSA) and Word2Vec. Topic modeling is a frequently used text-mining tool for discovery of hidden semantic structures in a text body.

According to an exemplary embodiment, the leveraging of the topic model (172) against the first dataset, $Dataset_0$ ($162_0$), down-samples the amount of data used to train the ANN (174) by selecting a subset of the first dataset, $Dataset_0$ ($162_0$), for training. Training with the down-sampled subset, also referred to as the training set, which is a subset of the first dataset rather than the whole first dataset, $Dataset_0$ ($162_0$), reduces computational time relating to training the ANN (174). According to an exemplary embodiment, the first similarity function is a cosine similarity function applied to the subject and object of each triple to generate first similarity scores. In an exemplary embodiment, the cosine similarity function is applied by the topic model, e.g., LSA or Word2Vec. For example, the similarity score, e.g. $SimilarityScore_{0,0}$, for $Triple_{0,0}$ ($164_{0,0}$) is a cosine similarity score calculated from $Subject_{0,0}$ ($166_{0,0}$) and $Object_{0,0}$ ($168_{0,0}$), the similarly score, e.g. $SimilarityScore_{0,1}$, for $Triple_{0,1}$ ($164_{0,1}$) is a cosine similarity score calculated for $Subject_{0,1}$ ($166_{0,1}$) and $Object_{0,1}$ ($168_{0,1}$), and the similarity score, e.g. $SimilarityScore_{0,m}$, for $Triple_{0,m}$ ($164_{0,m}$) is a cosine similarity score calculated for $Subject_{0,m}$ ($166_{0,m}$) and $Object_{0,m}$ ($168_{0,m}$)

Based on the similarity scores $SimilarityScore_{0,0}$, $SimilarityScore_{0,1}$, . . . and $SimilarityScore_{0,m}$, the topic model ($172$) selects a subset of triples from $Triple_{0,0}$ ($164_{0,0}$), $Triple_{0,1}$ ($164_{0,1}$), . . . and $Triple_{0,m}$ ($164_{0,m}$) of the first dataset $Dataset_0$ ($162_0$) as a training set, wherein the subset includes between one and "m minus 1" (m−1) triples. According to an embodiment, the triples $Triple_{0,0}$ ($164_{0,0}$), $Triple_{0,1}$ ($164_{0,1}$), . . . and $Triple_{0,m}$ ($164_{0,m}$) are ranked by the topic model manager ($152$) and the topic model manager ($152$) selects a predetermined quantity of top ranked triples. According to another embodiment, the topic model manager ($152$) selects a subset of the triples from $Triple_{0,0}$ ($164_{0,0}$), $Triple_{0,1}$ ($164_{0,1}$), . . . and $Triple_{0,m}$ ($164_{0,m}$) of the first dataset, $Dataset_0$ ($162_0$), having similarity scores satisfying a first threshold as the training set. For example, the training set may include $Triple_{0,0}$ ($164_{0,0}$) and $Triple_{0,1}$ ($164_{0,1}$) satisfying the first threshold, but may omit $Triple_{0,m}$ ($164_{0,m}$) that does not satisfy the first threshold. In an embodiment in which the similarity scores reflect cosine similarity, which denotes a measurement of how similar two data members are likely to be in terms of their subject matter. Generally, cosine similarity scores range between negative one (−1) and one (1), with a score of negative one representing opposites, a score of one representing the same, and a score of zero representing decorrelation. In an embodiment, the first threshold is set between 0 and 1, such as 0.5, with all scores from 0.5 to 1 satisfying the first threshold according to this embodiment.

The MLM manager ($154$) is configured to train the ANN ($174$) using the one or more triples of the selected training set, e.g., the subset $Triple_{0,0}$ ($164_{0,0}$) and $Triple_{0,1}$ ($164_{0,1}$) of the first dataset, $Dataset_0$ ($162_0$). In exemplary embodiments, the ANN ($174$) is trained for triple classification, link prediction, relation prediction, a combination thereof, and/or one or more additional operations and tasks using the training triples.

During training according to an embodiment, the MLM manager ($154$) employs the ANN ($174$) to assign or otherwise designate a confidence or veracity value to the data of the training set.

The AI platform ($150$) is further configured to receive a query ($176$). The various computing devices ($180$), ($182$), ($184$), ($186$), ($188$), and ($190$) in communication with the network ($105$) demonstrate access points for submitting the query ($176$). Alternatively, the query ($176$) may be accessed from the knowledge base ($160$) or from another knowledge base, user input, or another source. In an embodiment, the query ($176$) is subject to natural language processing (NLP) to extract the first entity, $Entity_1$ ($177$), and the relation, Relation ($178$).

In the embodiment illustrated in FIG. 1, the query, Query ($176$), includes a known entity, $Entity_{KNOWN}$ ($177$), and a relation, Relation ($178$), but does not include an unknown entity, $Entity_{UNKNOWN}$ ($179$). $Entity_{UNKNOWN}$ ($179$) possesses the Relation ($178$) with respect to the $Entity_{KNOWN}$ ($177$). In an embodiment, $Entity_{UNKNOWN}$ ($179$) is an answer to a question posed by $Entity_{KNOWN}$ ($177$) and Relation ($178$). According to an embodiment, the Query ($176$) includes a subject as the $Entity_{KNOWN}$ ($177$), and the Relation ($178$), and seeks $Entity_{UNKNOWN}$ ($179$), which is an object representing the answer to the Query ($176$). In another embodiment, the Query ($176$) includes an object as $Entity_{KNOWN}$ ($177$), and the Relation ($178$), and seeks $Entity_{unknown}$ ($179$), which is a subject representing the answer to the Query ($176$).

The topic model manager ($152$) is configured to leverage the trained topic model ($172$) against a second dataset, represented in FIG. 1 as $Dataset_1$ ($162_0$, for inference or testing purposes. Further, although one topic model ($172$) is shown in FIG. 1, it should be understood that two or more topic models may be accessible and leveraged, e.g., a first topic model for down sampling a dataset prior to training the ANN ($174$) and a second topic model for sample restricting another dataset prior to testing with the trained ANN ($174$).

According to an exemplary embodiment, the second dataset, $Dataset(162_1)$, represents additional data derived from the same KG as the first dataset, $Dataset_0$ ($162_0$). In an embodiment, the datasets $Dataset_0$ ($162_0$) and $Dataset_1$ ($162_1$) are different and derived from the same KG, such as, e.g., an embedding lookup table generated by the topic model ($172$). In another embodiment, the $Dataset_0$ ($162_0$) and $Dataset_1$ ($162_1$) are mutually exclusive, i.e., the data in $Dataset_1$ ($162_1$) has not been used for training. The $Dataset_1$ ($161_1$) comprises second entities and second edges linking or connecting the second entities. The $Dataset_1$ ($162_1$) includes a plurality of triples, specifically $Triple_{1,0}$ ($164_{1,0}$), $Triple_{1,1}$ ($164_{1,1}$), . . . and $Triple_{1,n}$ ($164_{1,n}$), wherein n is an integer equal to or greater than two. Although three triples are shown in the $Dataset_1$ ($162_1$), it should be understood that the $Dataset_1$ ($162_1$) may include additional triples, including tens, hundreds, thousands, millions, or billions of triples. $Triple_{1,0}$ ($164_{1,0}$) includes $Subject_{1,0}$ ($166_{1,0}$), $Relation_{1,0}$ ($167_{1,0}$), and $Object_{1,0}$ ($168_{1,0}$). $Triple_{1,1}$ ($164_{1,1}$) includes $Subject_{1,1}$ ($166_{1,1}$), $Relation_{1,1}$ ($167_{1,1}$), and $Object_{1,1}$ ($168_{1,1}$). $Triple_{1,n}$ ($164_{1,n}$) includes $Subject_{1,n}$ ($166_{1,n}$), $Relation_{1,n}$ ($167_{1,n}$), and $Object_{1,n}$ ($168_{1,n}$)

According to an exemplary embodiment, the leveraging of the topic model ($172$) against the second dataset, $Dataset_1$ ($162_1$), down-samples the amount of data used to test or use the ANN ($174$), e.g., for question-answer query resolution, by selecting a subset of the second dataset, $Dataset_1$ ($162_1$), as a candidate set. The candidate set, which is a subset of the second dataset rather than the whole second dataset, $Dataset_1$ ($162_0$, reduces computational time relating to testing or employing the ANN ($174$). According to an embodiment, the topic model ($172$) applies a second similarity function to the triples, $Triple_{1,0}$ ($164_{1,0}$), $Triple1_{0,1}$ ($164_{1,1}$), and $Triple_{1,n}$ ($164_{1,n}$), of second dataset, $Dataset_1$ ($162_1$).

The second similarity function assessed by the topic model ($172$) may be the same as or different than the first similarity function. According to an exemplary embodiment, the second similarity function is a cosine similarity function applied to the subject and object of each triple to generate second similarity scores. For example, the similarity score, e.g., $SimilarityScore_{1,0}$, for $Triple_{1,0}$ ($164_{1,0}$) is a cosine similarity score calculated from $Subject_{1,0}$ ($166_{1,0}$) and $Object_{1,0}$ ($168_{1,0}$), the similarly score, e.g., $SimilarityScore_{1,1}$ for $Triple_{1,1}$ ($164_{1,1}$) is a cosine similarity score calculated for $Subject_{1,1}$ ($166_{1,1}$) and $Object_{1,1}$ ($168_{14}$), and the similarly score, e.g., $SimilarityScore_{1,n}$ for $Triple_{1,n}$ ($164_{1,n}$) is a cosine similarity score calculated for $Subject_{1,n}$ ($166_{1,n}$) and $Object_{1,n}$ ($168_{1,n}$).

Based on the similarity scores $SimilarityScore_{1,0}$, $SimilarityScore_{1,1}$, . . . and $SimilarityScore_{1,n}$, the topic model manager ($152$), or in an embodiment the MLM manager ($154$), selects a subset of triples from $Triple_{1,0}$ ($164_{1,0}$), $Triple_{1,1}$ ($164_{1,1}$), . . . and $Triple_{1,n}$ ($164_{1,n}$) of the second dataset $Dataset_1$ ($162_1$) as candidates, wherein the subset includes between one and "n minus 1" (n-1) triples. According to an embodiment, the triples $Triple_{1,0}$ ($164_{1,0}$), $Triple_{1,1}$ ($164_{1,1}$), . . . and $Triple_{1,n}$ ($164_{1,n}$) are ranked by the topic model manager (152), and a predetermined number of top ranked triples are selected as a candidate set. According to another embodiment, the topic model (152) identifies and selects a subset of the triples from $Triple_{1,0}$ ($164_{1,0}$), $Triple_{1,1}$ ($164_{1,1}$), . . . and $Triple_{1,n}$ ($164_{1,n}$) of the second dataset, $Dataset_1$ ($162_1$), having similarity scores satisfying a second threshold as the candidate set. For example, the training set may include $Triple_{1,0}$ ($164_{1,0}$) and $Triple_{1,1}$ ($164_{1,1}$) satisfying the second threshold, but may omit $Triple_{1,n}$ ($164_{1,n}$) that does not satisfy the second threshold. In an embodiment in which the similarity scores reflect cosine similarity, which denotes a measurement of how similar two data members are likely to be in terms of their subject matter. Generally, cosine similarity scores range between negative one (−1) and one (1), with a score of negative one representing opposites, a score of one representing the same, and a score of zero representing decorrelation. In an embodiment, the second threshold is set between 0 and 1, such as 0.5, with all scores from 0.5 to 1 satisfying the second threshold according to this embodiment.

The MLM manager (154) is configured to leverage the trained ANN (174) to assess, for each candidate triple of the second subset, a respective confidence score of the entity of the candidate triple corresponding to the $Entity_{UNKNOWN}$ (179) of the Query (176). In one or more exemplary embodiments, leveraging the trained ANN (174) against the second subset (or candidate triples) involves an assessment or scoring of a confidence value of the entity of each candidate triple that corresponds to the $Entity_{UNKNOWN}$ (179) of the Query (176). In an embodiment, if the $Entity_{KNOWN}$ (177) of the Query (176) is a subject, the assessment with the trained ANN (174) determines a confidence score for each object of the candidate set, e.g., $Object_{1,0}$ ($168_{1,0}$), $Object_{1,1}$ ($168_{1,n}$), . . . and/or $Object_{1,n}$ ($168_{1,n}$)). In another embodiment, if the $Entity_{KNOWN}$ (177) of the Query (176) is an object, the assessment determines a confidence score for each subject of the candidate set, e.g., $Subject_{1,0}$ ($166_{1,0}$), $Subject_{1,1}$ ($166_{1,1}$), . . . and/or $Subject_{1,n}$ ($166_{1,n}$)). At least one of the second entities of the second subset output as a candidate for $Entity_{UNKNOWN}$ (179) of the query (176) based upon the confidence score.

The various computing devices (180), (182), (184), (186), (188), and (190) in communication with the network (105) demonstrate access points for submitting the Query (176). Some of the computing devices may include devices for a database storing the corpus of data as a body of information used by the knowledge engine (150), and in one embodiment the tools (152) and (154). The computer network (105) may include local network connections and remote connections in various embodiments, such that the knowledge engine (150) and the embedded tools (152) and (154), and may operate in environments of any size, including local and global, e.g., the Internet.

The server (110) may be the IBM Watson® system available from International Business Machines Corporation of Armonk, New York, which is augmented with the mechanisms of the illustrative embodiments described hereafter. The IBM Watson® knowledge manager system imports a first dataset, $Dataset_0$ ($162_0$), comprising a plurality of triples (e.g., $Triple_{0,0}$ ($164_{0,0}$), $Triple_{0,1}$ ($164_{0,1}$), . . . $Triple_{0,m}$ ($164_{0,m}$)) into the topic model (172). Specifically, in an embodiment, the triples of the first dataset, $Dataset_0$ ($162_0$), are subject to down sampling into a subset of triples, also referred to herein as the training triples. The training triples are used to train the ANN (174).

Additionally, the IBM Watson® knowledge manager system imports the second dataset, $Dataset_0$ ($162_1$), comprising a plurality of triples (e.g., $Triple_{1,0}$ ($164_{1,0}$), $Triple_{1,1}$ ($164_{1,1}$), . . . , $Triple_{1,n}$ ($164_{1,n}$)) into the topic model (172). Specifically, in an embodiment, the triples of the second dataset, $Dataset_1$ ($162_1$), are subject to down sampling into a subset of triples, also referred to herein as the candidate triples. The trained ANN (174) is leveraged against the candidate triples and a query.

The server (110) utilizes the AI platform (150) and associated tools (152) and (154) to support training and testing of the ANN (174). Though shown as being embodied in or integrated with the server (110), the AI platform (150) may be implemented in a separate computing system (e.g., 190) that is connected across the computer network (105) to the server (110). Although shown local to the server (110), tools (152) and (154) may collectively or individually be embedded in memory (114) or elsewhere.

Types of information handling systems that can utilize system (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188) and a server (190). As shown, the various information handling systems can be networked together using the computer network (105). Types of the computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a)). The nonvolatile data store (182a) can be a component that is external to the various information handling systems or can be internal to one of the information handling systems.

An information handling system may take many forms, some of which are shown in FIG. 1. For example, an information handling system may take the form of a desktop, a server, a portable laptop, a notebook, or other form factor computer or data processing system. In addition, an information handling system may take other form factors such as a personal digital assistant (PDA), a gaming device, an ATM machine, a portable telephone device, a communication device or other devices that include a processor and memory.

An Application Program Interface (API) is understood in the art as a software intermediary between two or more applications. With respect the system shown and described in FIG. 1, one or more APIs may be utilized to support one or more of the tools (152) and (154) and their associated functionality. Referring to FIG. 2, a block diagram (200) is provided illustrating the NL processing tools and their associated APIs. As shown, a plurality of tools are embedded within the knowledge engine (205), with the tools including the topic model manager (252) associated with $API_0$ (212), and the MLM manager (254) associated with API$_1$ (222). Each of the APIs may be implemented in one or more languages and interface specifications. API$_0$ (212) associated with the topic model manager (252) provides leveraging of one or more topic models against datasets and selection of subsets; API$_1$ (222) associated with the MLM manager (254) provides training an ANN with a selected first subset and leveraging the trained ANN against a selected second subset, e.g., for testing purposes. As shown, each of the APIs (212) and (222) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

To provide additional details for an improved understanding of selected embodiments of the present disclosure, reference is now made to FIG. 3 which illustrates a flowchart (300) of a method for the use of the first topic model for down sampling a dataset into a subset of training data for training an artificial neural network (ANN). Referring to FIG. 3, a first dataset, which in exemplary embodiments comprises or is derived from one or more knowledge graphs, including a plurality of triples is accessed (302). The total number of triples is quantified and set as $M_{TOTAL}$ (304). The variable M representing a triple of the dataset is initialized (306). The first topic model is leveraged against the triple, Triple$_M$ (308). At (310), a first similarity score Score$_M$ is assessed for the Triple$_M$. According to an exemplary embodiment, the first similarity score is based on the cosine similarity between the entities (e.g., the subject and object) of the Triple$_M$. The variable M is then incremented (312), and a determination is made whether each of the triples in the first dataset have been assessed, e.g., whether the incremented value of M is greater than the total quantity of triples, $M_{TOTAL}$ (314), in the dataset. If answered in the negative, the method returns for step (308) for leveraging the first topic model against the triple with the incremented variable M. If at step (314) the assessment is answered in the affirmative, the triples Triple$_1$ through Triple$_{M_{Total}}$ are ranked or otherwise sorted through a sort algorithm based on their associated first similarity scores (316). A first subset of training triples is identified from the ranked or sorted dataset of triples (318). According to an embodiment, the training triples of the first subset have associated first similarity scores satisfying a first threshold. The training triples of the first subset are used to train a transformer-based ANN (320).

FIG. 4 illustrates a flowchart (400) pertaining to an embodiment of a method for using a second topic model to down sample a second dataset into a subset of candidates for use, testing, or validation of a trained ANN. Referring to FIG. 4, a second dataset, which in exemplary embodiments comprises or is derived from one or more knowledge graphs, including a plurality of triples is accessed (402). The total number of triples is quantified and set as $N_{Total}$ (404). A counting variable N representing a triple of the second dataset is initialized (406). The second topic model, which may be the same as or different than the first topic model discussed above in connection with FIG. 3, is leveraged against the triple, Triple$_N$ (408). At (410), a second similarity score Score$_N$ is assessed for the Triple$_N$. According to an exemplary embodiment, the second similarity score is based on the cosine similarity between the entities (e.g., the subject and object) of the Triple$_N$. The variable N is then incremented (412), and a determination is made whether each of the triples in the second dataset have been assessed, e.g., whether the incremented value of N is greater than $N_{TOTAL}$ (414). A negative response at the determination step (414) is an indication that one or more additional triples remain for processing, and the method returns to step (408) for leveraging the second topic model against the triple with the incremented variable N. An affirmative response at the determination step (414) is an indication that all of the triples have been processed, and the method proceeds to step (416). The triples Triple$_1$ through Triple$_{N_{Total}}$ are ranked, or otherwise sorted through a sort algorithm, based on their associated second similarity scores (416). A second subset of triples is identified from the dataset of triples (418). According to an embodiment, the triples of the second subset of triples have associated second similarity scores satisfying a second threshold.

Referring to FIG. 5, a flowchart (500) is provided illustrating a method of an embodiment of using the trained ANN, e.g., in connection with testing, validation, or making predictions. A query is received (502) that includes a known entity and a relation, but omitting an unknown entity that possesses the relation with respect to the known entity. The second set of candidate triples, developed in accordance with method of the flowchart (400) of FIG. 4, is accessed (504). The total quantity of candidate triples is set as $P_{TOTAL}$ (506), and a counting variable P is initialized (508). For Candidate Triple$_P$, the entity of Candidate Triple$_P$ corresponding to the unknown entity of the query is identified as Candidate Entity$_P$ (510). For example, if the query includes a subject as the unknown entity, the subject of Candidate Triple$_P$ is identified as the Candidate Entity$_P$. On the other hand, if the query includes an object as the unknown entity, the object of Candidate Triple$_P$ is identified as the Candidate Entity$_P$.

The trained ANN is leveraged to assess a confidence score, Score$_P$, of Candidate Entity$_P$ of Candidate Triple$_P$. At (514), the counting variable P is incremented, and a determination is made whether each of the candidate triples have been processed with respect to the assessment of the confidence score, e.g., whether the incremented counting variable P is greater than $P_{TOTAL}$ (516). If negative decision at the determination step (516) is an indication that one or more additional candidate triples remain for processing, and the method returns to step (510). On the other hand, an affirmative decision at determination step (516) is an indication that the trained ANN has been leveraged against all of the candidate entities.

Candidate Entity$_1$ to Candidate Entity$_{P_{Total}}$ are ranked or otherwise sorted through a sort algorithm based on their associated confidence scores (518). According to an embodiment, the candidate entry with the most favorable (e.g., highest) confidence score is identified as output. According to another embodiment, one or more of the candidate entities having an associated confidence score satisfying a third threshold is identified (520). According to still another embodiment, the candidate entries are evaluated by a SME.

According to an embodiment, one or more additional edges and/or nodes associated with the one or more identified candidate entities is selectively embedded in the KG (522). Accordingly, as shown herein, the topic model(s) is/are leveraged to effectively restrict candidates for training, testing, and/or processing by the ANN, which then identifies candidate entities for selective embedding of one or more edges in the corresponding KG.

Aspects of employing a topic model for training, testing, validation, and/or use of an ANN are shown and described with the tools and APIs shown in FIGS. 1 and 2, and the processes shown in FIGS. 3, 4, and 5. Aspects of the functional tools (152) and (154) and their associated functionality may be embodied in a computer system/server in a single location, or in an embodiment, may be configured in a cloud-based system sharing computing resources. With references to FIG. 6, a block diagram (600) is provided illustrating an example of a computer system/server (602), hereinafter referred to as a host (602) in communication with a cloud-based support system, to implement the processes described above with respect to FIGS. 3-5. The host (602) is operational with numerous other general purpose or special purpose computing system environments or configurations. Examples of well-known computing systems, environments, and/or configurations that may be suitable for use with the host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (602) may be described in the general context of computer system-executable instructions, such as program modules, being executed by a computer system. Generally, program modules may include routines, programs, objects, components, logic, data structures, and so on that perform particular tasks or implement particular abstract data types. The host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
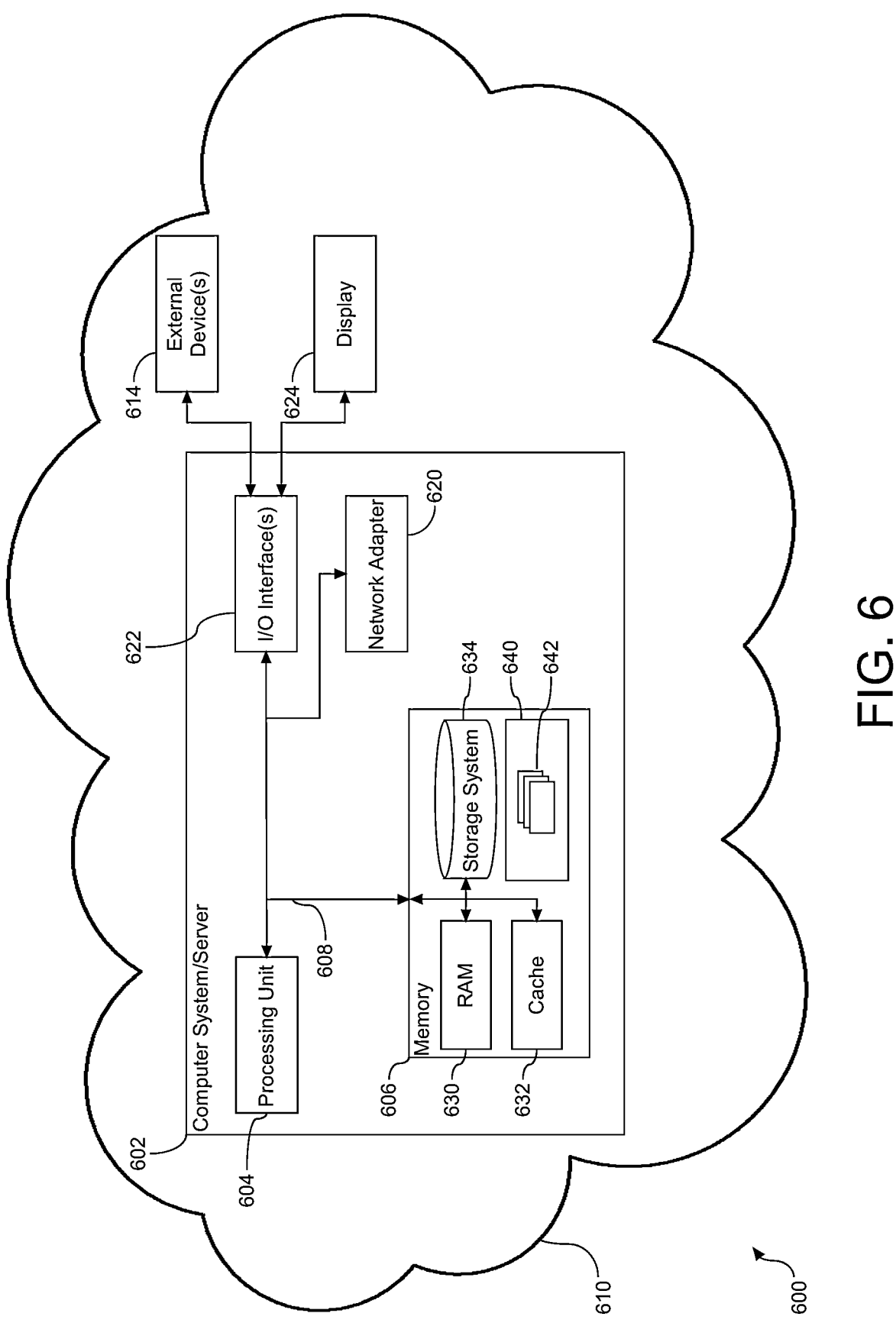
FIG. 6 depicts a block diagram illustrating an example of a computer system/server of a cloud based support system, to implement the system and processes described above with respect to FIGS. 1-5.

As shown in FIG. 6, the host (602) is shown in the form of a general-purpose computing device. The components of the host (602) may include, but are not limited to, one or more processors or processing units (604), e.g. hardware processors, a system memory (606), and a bus (608) that couples various system components including the system memory (606) to the processing unit(s) (604). The bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (602) typically includes a variety of computer system readable media. Such media may be any available media that is accessible by the host (602) and it includes both volatile and non-volatile media, removable and non-removable media.

The memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus (608) by one or more data media interfaces.

Program/utility (640), having a set (at least one) of program modules (642), may be stored in the memory (606) by way of example, and not limitation, as well as an operating system, one or more application programs, other program modules, and program data. Each of the operating systems, one or more application programs, other program modules, and program data or some combination thereof, may include an implementation of a networking environment. The program modules (642) generally carry out the functions and/or methodologies of embodiments to support and enable down sampling and ANN training and use. For example, the set of the program modules (642) may include the tools (152) and (154) as described in FIG. 1.

The host (602) may also communicate with one or more external devices (614), such as a keyboard, a pointing device, etc.; a display (624); one or more devices that enable a user to interact with the host (602); and/or any devices (e.g., network card, modem, etc.) that enable the host (602) to communicate with one or more other computing devices. Such communication can occur via Input/Output (I/O) interface(s) (622). Still yet, the host (602) can communicate with one or more networks such as a local area network (LAN), a general wide area network (WAN), and/or a public network (e.g., the Internet) via network adapter (620). As depicted, the network adapter (620) communicates with the other components of the host (602) via the bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with the host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as the main memory (606), including RAM (630), cache (632), and storage system (634), such as a removable storage drive and a hard disk installed in a hard disk drive.

Computer programs (also called computer control logic) are stored in the memory (606). Computer programs may also be received via a communication interface, such as the network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In an embodiment, the host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
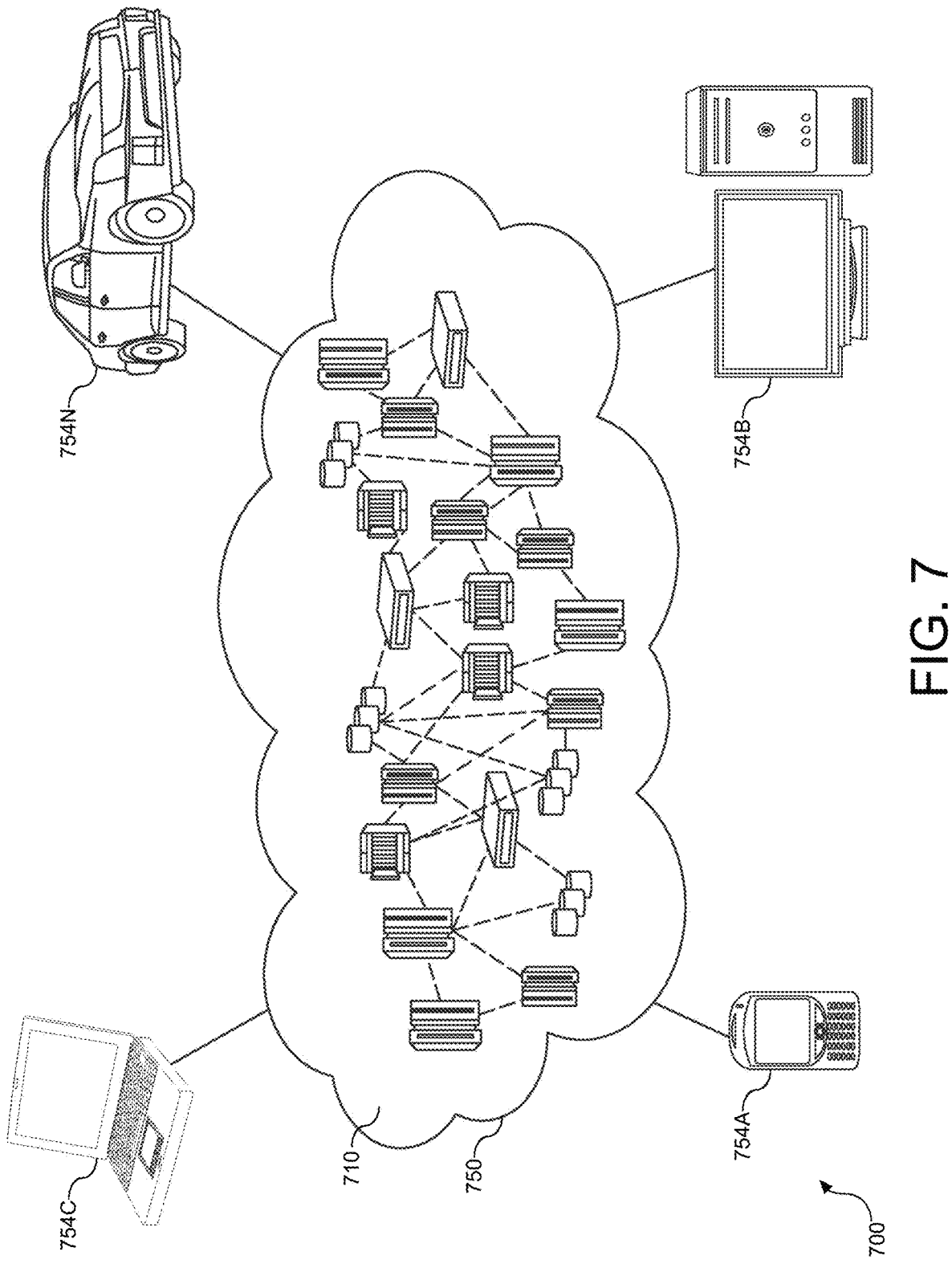
FIG. 7 depicts a block diagram illustrating a cloud computer environment.

Referring now to FIG. 7, a cloud computing network (700) is illustrated. As shown, the cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within the cloud computing nodes (710) may further communicate with one another. They may be grouped (not shown) physically or virtually, in one or more networks, such as Private, Community, Public, or Hybrid clouds as described hereinabove, or a combination thereof. This allows the cloud computing environment (700) to offer infrastructure, platforms and/or software as services for which a cloud consumer does not need to maintain resources on a local computing device. It is understood that the types of the computing devices (754A-N) shown in FIG. 7 are intended to be illustrative only and that the cloud computing environment (750) can communicate with any type of computerized device over any type of network and/or network addressable connection (e.g., using a web browser).

Figure 8:
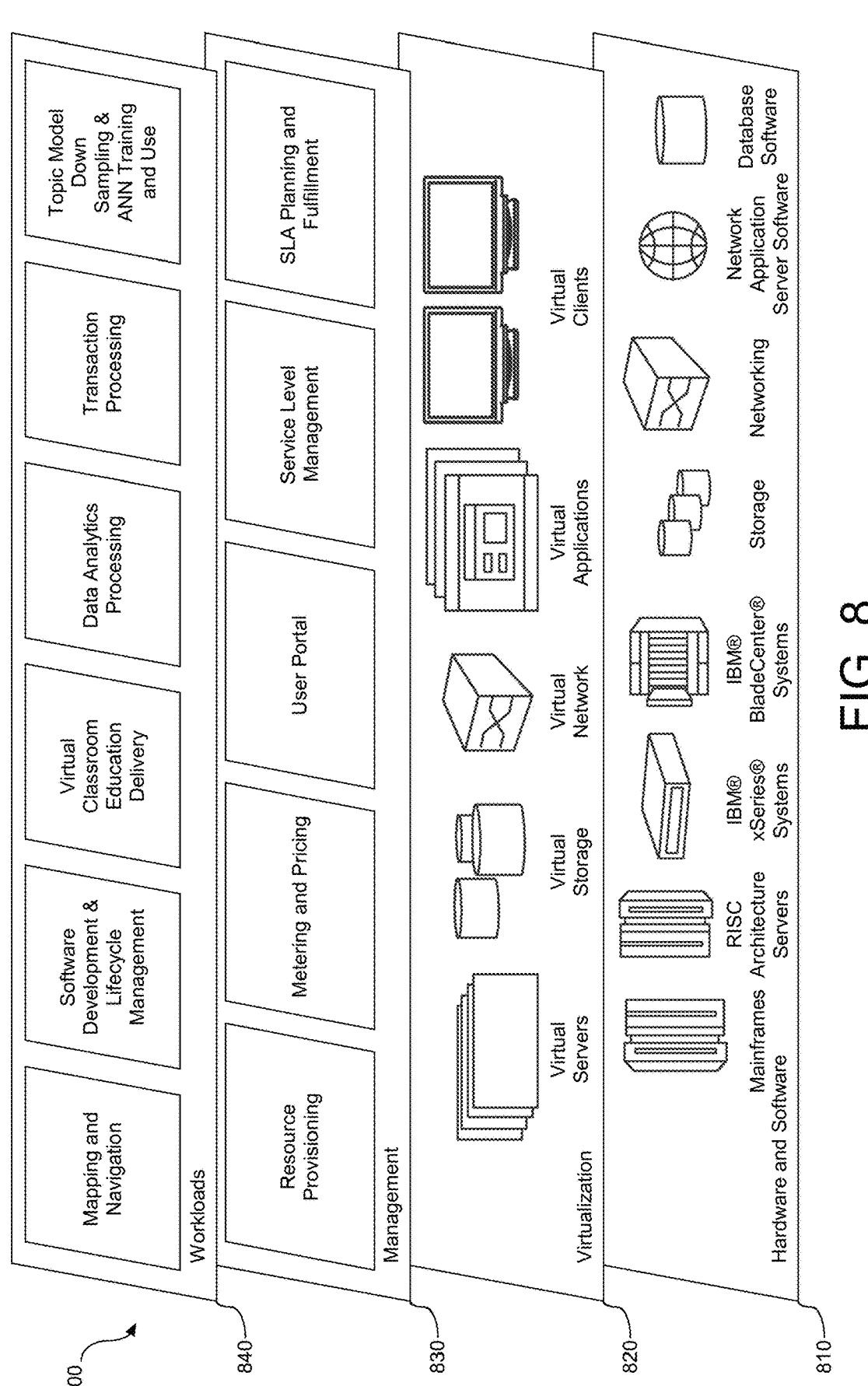
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and topic model down sampling and ANN training and use.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to provide improvements to transfer learning operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium and computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additional blocks not represented in the Figures may be included, for example, prior to, subsequent to, or concurrently with one or more illustrated blocks. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
a processor operatively coupled to memory; and
an artificial intelligence (AI) platform in communication with the processor and the memory, the AI platform comprising:
a topic model manager configured to:
leverage a first topic model against a first dataset, the first dataset derived from an open knowledge graph (open KG) comprising a plurality of first triples, each of the plurality of first triples comprising first entities and first edges connecting the first entities to represent relationships between the first connected entities,
the leverage of the first topic model comprising:
applying a first similarity function to the first connected entities of the plurality of first triples to provide respective first similarity scores; and
down sampling, using the first topic model, the plurality of first triples into a first subset of training triples based on the first similarity scores, wherein the first subset comprises training triples having first similarity scores satisfying a first threshold;
a machine learning manager (MLM) configured to train a transformer based artificial neural network (ANN) using the first subset of training triples, wherein the training of the transformer based ANN includes:
leveraging, based on a cosine similarity, the first topic model to evaluate and classify the training triples;
ranking, based on the leveraging, the training triples;
restricting, based on the ranking, the training triples to generate a restricted subset of training triples for training the ANN;
training, by the MLM based on the restricting, the ANN with the restricted subset of training triples; and
performing, using the trained ANN, one or more KG tasks, the one or more KG tasks comprising at least one of triple classification, link prediction, relation prediction, or a combination thereof; and
an orchestration layer configured to thread together the topic model manager and the MLM to deploy the trained ANN.

2. The computer system of claim 1, wherein the first similarity function comprises a cosine similarity function.

3. The computer system of claim 1, wherein:
the AI platform is configured to receive a query including a known entity and a relation, the query omitting an unknown entity which possesses the relation with respect to the known entity;
the topic model manager is further configured to:
leverage a second topic model against a second dataset comprising a plurality of second triples, each of the plurality of second triples comprising second entities and second edges connecting the second entities to represent relationships between the second connected entities, the leverage of the second topic model including to apply a second similarity function, which may be the same as or different than the first similarity function, to the second connected entities of the second triples to provide respective second similarity scores; and select a second subset of triples from the plurality of second triples based upon the second similarity scores; and the MLM manager is further configured to:

leverage the trained ANN to assess, for each of the second entities of the second subset corresponding to the unknown entity of the query, a respective confidence score; and output at least one of the second entities of the second subset based upon the confidence score.

4. The computer system of claim 3, wherein the second similarity function comprises a cosine similarity function.

5. The computer system of claim 3, wherein the second dataset is derived from the open KG and is different than the first dataset.

6. The computer system of claim 1, wherein the ANN comprises a knowledge graph bi-directional encoder representations from transformer (KG-BERT) model.

7. The computer system of claim 1, wherein the computer system is not configured to carry out canonicalization of the first entities of the open KG, and wherein the computer system is configured to operate unsupervised.

8. A computer program product comprising:

a computer readable storage device; and program code embodied with the computer readable storage device, the program code executable by a processor to:

leverage a first topic model against a first dataset, the first dataset derived from an open knowledge graph (open KG) comprising a plurality of first triples, each of the plurality of first triples comprising first entities and first edges connecting the first entities to represent relationships between the first connected entities;

apply a first similarity function to the first connected entities of the plurality of first triples to provide respective first similarity scores;

down sample, using the first topic model, the plurality of first triples into a first subset of training triples based on the first similarity scores, wherein the first subset comprises training triples having first similarity scores satisfying a first threshold;

leverage, based on a cosine similarity, the first topic model to evaluate and classify the training triples;

rank, based on the leveraging, the training triples;

restrict, based on the ranking, the training triples to generate a restricted subset of training triples for training a transformer-based artificial neural network (ANN);

train, based on the restricting, the ANN with the restricted subset of training triples, wherein an application program interface (API) is operatively coupled to an orchestration layer, the orchestration layer functions as an abstraction layer to thread together the ranking and the training;

deploy the trained ANN; and perform, using the trained ANN, one or more KG tasks, the one or more KG tasks comprising at least one of triple classification, link prediction, relation prediction, or a combination thereof.

9. The computer program product of claim 8, wherein the first similarity function comprises a cosine similarity function.

10. The computer program product of claim 8, wherein the program code is further executable by the processor to:

receive a query including a known entity and a relation, the query omitting an unknown entity which possesses the relation with respect to the known entity;

leverage a second topic model against a second dataset comprising a plurality of second triples, each of the plurality of second triples comprising second entities and second edges connecting the second entities to represent relationships between second connected entities, the leverage of the second topic model including to apply a second similarity function, which may be the same as or different than the first similarity function, to the second connected entities of the plurality of second triples to provide respective second similarity scores; and select a second subset of triples from the plurality of second triples based upon the second similarity scores;

leverage the trained ANN to assess, for each of the second entities of the second subset corresponding to the unknown entity of the query, a respective confidence score; and output at least one of the second entities of the second subset based upon the confidence score.

11. The computer program product of claim 10, wherein the second similarity function comprises a cosine similarity function.

12. The computer program product of claim 10, wherein the second dataset is derived from the open KG and is different than the first dataset.

13. The computer program product of claim 8, wherein the ANN comprises a knowledge graph bi-directional encoder representations from transformer (KG-BERT) model.

14. The computer program product of claim 8, wherein the computer program product does not comprise program code executable by the processor to carry out canonicalization of the first entities of the KG, and wherein the computer program product is configured to operate unsupervised.

15. A method comprising:

leveraging a first topic model against a first dataset, the first dataset derived from an open knowledge graph (open KG) comprising a plurality of first triples, the plurality of first triples comprising first entities and first edges connecting the first entities to represent relationships between the first connected entities;

applying a first similarity function to the first connected entities of the plurality of first triples to provide respective first similarity scores;

down sampling, using the first topic model, the plurality of first triples into a first subset of training triples based on the first similarity scores, the first subset comprises training triples having first similarity scores satisfying a first threshold; and leveraging, based on a cosine similarity, the first topic model to evaluate and classify the training triples;

ranking, based on the leveraging, the training triples;

restricting, based on the ranking, the training triples to generate a restricted subset of training triples for training a transformer-based artificial neural network (ANN);

training, based on the restricting, the ANN with the restricted subset of training triples, wherein an application program interface (API) is operatively coupled to an orchestration layer, the orchestration layer functioning as an abstraction layer to thread together the ranking and the training;

deploying the trained ANN; and performing, using the trained ANN, one or more KG tasks, the one or more KG tasks comprising at least one of triple classification, link prediction, relation prediction, or a combination thereof.

16. The method of claim 15, wherein the first similarity function comprises a cosine similarity function.

17. The method of claim 15, further comprising:

receiving a query including a known entity and a relation, the query omitting an unknown entity which possesses the relation with respect to the known entity;

leveraging a second topic model against a second dataset comprising a plurality of second triples, each of the plurality of second triples comprising second entities and second edges connecting the second entities to represent relationships between the second connected entities, the leveraging of the second topic model including to apply a second similarity function, which may be the same as or different than the first similarity function, to the second connected entities of the second triples to provide respective second similarity scores; and selecting a second subset of triples from the plurality of second triples based upon the second similarity scores;

leveraging the trained ANN to assess, for each of the second entities of the second subset corresponding to the unknown entity of the query, a respective confidence score; and outputting at least one of the second entities of the second subset based upon the confidence score.

18. The method of claim 17, wherein the second similarity function comprises a cosine similarity function.

19. The method of claim 17, wherein the second dataset is derived from the open KG and is different than the first dataset.

20. The method of claim 15, wherein the ANN comprises a knowledge graph bi-directional encoder representations from transformer (KG-BERT) model.

\* \* \* \* \*